United States Patent Office 3,394,170
Patented July 23, 1968

---

3,394,170
PRODUCTION OF POLYACYLOXY ALKADIENES, ALKENES, AND ALKANES
Charles F. Kohll, Amsterdam, Netherlands, assignor to Shell Oil Company, New York, N.Y., a corporation of Delaware
No Drawing. Continuation-in-part of application Ser. No. 472,664, July 16, 1965. This application June 27, 1966, Ser. No. 560,894
Claims priority, application Netherlands, Aug. 19, 1964, 6409545; July 20, 1965, 6509342
11 Claims. (Cl. 260—491)

ABSTRACT OF THE DISCLOSURE

Production of acyloxy-substituted conjugated alkadienes, alkenes, and alkanes, in which the grouping

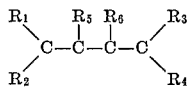

occurs, in which grouping each of the terminal carbon atoms may be attached by a double bond to the adjacent carbon atom or to a group $R_7$, in which case the adjacent carbon atom, in addition to the substituent $R_5$ or $R_6$, also carries a hydrogen atom, and in which $R_1$, $R_3$ and $R_7$ are acyloxy groups of from 2 to 21 carbons and $R_2$, $R_4$, $R_5$ and $R_6$ represent a hydrogen atom or a lower alkyl group, especially of 1 to 5 carbon atoms, by reacting 1-methylenealkyl hydrocarbylcarboxylates of the formula

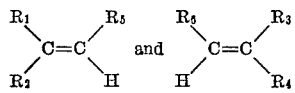

wherein $R_1$, $R_2$, $R_3$, $R_4$, $R_5$ and $R_6$ are defined as above, with carboxylates of precious metals of Group VIII of the Periodic Table of the Elements in the presence of a carboxylic acid $HR_7$ in excess with respect to the unsaturated starting material and $R_7$ is defined as above.

---

This application is a continuation-in-part of copending U.S. application Ser. No. 472,664, filed July 16, 1965, now abandoned.

This invention relates to the preparation of acyloxy conjugated alkadienes, alkenes, and alkanes, and more particularly to the preparation of 1,4-diacyloxy-1,3-butadiene, 1,1,4-triacyloxy-3-butene, and 1,1,4,4-tetraacyloxybutane.

The preparation of 1,4-diacetoxybutadiene is already disclosed by Inhoffen, German application 1,020,621, printed Dec. 12, 1957. According to this reference one starts from crotonaldehyde, which is reacted with acetic anhydride. The reaction product is converted with N-bromosuccinimide into gamma-bromocrotonaldehyde diacetate. By means of acetic acid the bromide atom is then exchanged for an acetoxy group. Finally, the desired product, 1,4-diacetoxybutadiene, can be obtained by pyrolysis at a temperature above 120° C., yields of 20–57% being achieved.

It has been found that 1,4-diacyloxybutadiene compounds can be prepared in a much simpler way and in considerably higher yields than by the method of the aforementioned application.

Starting from 1,4-diacyloxybutadiene, one can prepare 1,1,4-triacyloxy-3-butene and 1,1,4,4-tetracyloxybutane by addition of one and two molecules, respectively, of carboxylic acid to one or to both double carbon-carbon bonds by means of addition reactions.

It has now been found that these tri- and tetra-acyloxy compounds can be prepared directly in a much simpler way than by the known method of stepwise addition.

The invention can be defined as a process for the preparation of acyloxy-substituted conjugated alkadienes, alkenes, and alkanes, in which the grouping

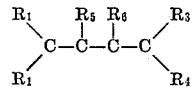

occurs, in which grouping each of the terminal carbon atoms may be attacted by a double bond to the adjacent carbon atom or to a group $R_7$, in which case the adjacent carbon atom, in addition to the substituent $R_5$ or $R_6$, also carries a hydrogen atom, and in which $R_1$, $R_3$ and $R_7$ are acyloxy groups of from 2 to 21 carbons, $R_2$, $R_4$, $R_5$, and $R_6$ represent a hydrogen atom or a lower alkyl group, especially of 1 to 5 carbon atoms, consisting essentially of the reaction of 1-methylenealkyl hydrocarbylcarboxylates of the formula

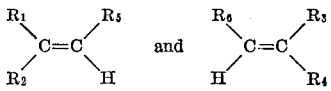

wherein $R_1$, $R_2$, $R_3$, $R_4$, $R_5$ and $R_6$ are defined as above, with carboxylates of precious metals of Group VIII of the Periodic Table of the Elements in the presence of carboxylic acid $HR_7$, wherein said acid is in excess with respect to unsaturated starting material and $R_7$ is defined as above.

The compounds obtained from the process of the invention which contain the indicated grouping will therefore be compounds with the general formula

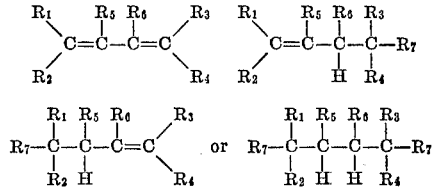

In the first instance the compounds are diacyloxy conjugated alkadienes, in the second and in the third instances triacyloxyalkenes, and in the fourth, tetraacyloxyalkanes, in which the various acyloxy groups which are present may be similar or dissimilar.

In the 1-alkenyl carboxylates

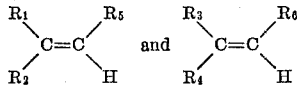

$R_1$ and $R_3$ are acyloxy radicals derived from organic carboxylic acids of from 2 to 21 carbons. Although acyloxy radicals derived from alkanoic monocarboxylic acids are preferred, those derived from organic acids in which the carboxylic group is attached to varied hydrocarbon moieties are useful. The hydrocarbon moieties may be further substituted, for example, with halo, alkoxy, or even additional carboxyl groups.

Additional carboxyl groups may be present, e.g., as in the monovinyl aromatic dicarboxylic acid esters of British Patent 833,471, published Apr. 27, 1960. The aforesaid hydrocarbon moieties may be aliphatic, including cyloaliphatic, as in the alkenyl esters of W. E. Hanford and W. E. Mochel, U.S. Patent 2,310,780, issued Feb. 9, 1943. Alkanoic monocarboxylic acids, from which the preferred acyloxy radicals may be derived, include acetic acid, propionic acid, butyric acid, isobutyric acid, and the like; and acids in which the carboxyl group is bound directly to a tertiary or a quaternary carbon atom—that is, trialkylacetic acids such as pivalic acid or acids which can be prepared according to M. J. Waale and J. M. Vos, U.S. Patent 3,059,004, issued Oct. 16, 1962. Thus, a preferred group of $R_1$ and $R_3$ acyloxy radicals are those containing an alkyl tail of from 1 to 20 carbon atoms. 1-alkenyl carboxylates may be prepared from the aforementioned acids according to the process of Belgian Patent 614,971, published Sept. 12, 1962. Particularly useful esters are the vinyl ($CH_2=CH-$) carboxylates, which may be prepared according to W. S. Port and H. A. Monroe, Jr., U.S. Patent 3,158,633, issued Nov. 24, 1964. Hence, $R_5$ and $R_6$ in the formulas are preferably hydrogen atoms. In case one or more of these groups represents a lower alkyl group, it is preferably a methyl or an ethyl group, for example isopropenyl acetate. Other alkyl groups, for example, with 3–7 carbon atoms are also satisfactory but the compounds containing these groups react in the process of the invention more slowly, probably owing to steric hindrance. Very favorable results are obtained if $R_1$ is similar to $R_3$, $R_2$ to $R_4$, and $R_5$ to $R_6$. Symmetric products are then formed with high selectivities.

Suitable representative 1-methylenealkyl hydrocarbylcarboxylates which may be used in the process of the invention include isopropenyl acetate, vinyl oleate, monovinyl isophthalate, monovinyl terephthalate, vinyl campholate, vinyl 3-chloro-2,2-dimethylbutyrate, vinyl 3-methoxy-2,2-diethylpropionate, and the preferred vinyl esters of saturated acids such as vinyl acetate, vinyl propionate, vinyl butyrate, vinyl isobutyrate, vinyl octanoate, vinyl laurate, vinyl palmitate, vinyl pivalate, vinyl trialkylacetates, and the like.

The carboxylic acid $HR_7$ which according to the invention is present in excess with respect to unsaturated starting material, is preferably acetic acid. Propionic acid, butyric acid, pivalic acid and other acids whose carboxyl group is attached to a tertiary or quaternary carbon atom are also useful. The use of acids in which the group $R_7$ is similar to the group $R_1$ and/or $R_3$ is preferred.

According to the invention the reaction involves carboxylates of precious metals of Group VIII of the Periodic Table of the Elements (H. D. Hubbard, published by W. M. Welch Manufacturing Co., 1950 ed.). It is assumed that these salts react with hydrogen atoms or ions, which are liberated on the formation of compounds which may be obtained according to the present process. In this reaction, from the salts the corresponding acids are then formed, while the valency of the metallic components is reduced.

The precious metals of Group VIII include ruthenium, rhodium, palladium, osmium, iridium and platinum. The salts of the precious metals, of which those of palladium are preferred, especially useful in the process of the invention are those of monocarboxylic alkanoic acids of 2 to 21 carbon atoms. Very suitable are acetates and also propionates and pivalates. It is preferred that the salts be derived from the carboxylic acid $HR_7$, i.e., from the same acid that is present in excess in the reaction mixture.

The formation of the compounds obtained by the process of the invention is believed to proceed via an oxidative coupling reaction in which, where $R_1$ is similar to $R_3$, $R_2$ to $R_4$ and $R_5$ to $R_6$, two similar molecules

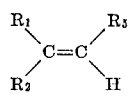

are coupled, with two hydrogen atoms being split off, one from each molecule, to an alkadiene derivative,

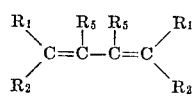

The alkene and alkane derivatives

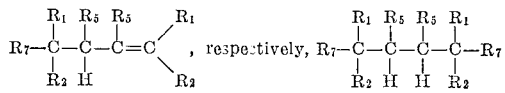

can then be represented as being formed by addition of one and two molecules, respectively, of the carboxylic acid $HR_7$ to one and both double carbon-carbon bonds, respectively, of the diacyloxy conjugated alkadiene. However, the formation of the said acyloxy-substituted alkanes and alkenes does not proceed through addition of one or two carboxylic acid molecules to a previously formed alkadiene compound. Both the alkadiene compounds and the alkane and alkene derivatives are formed directly through decomposition of complexes of precious metals and unsaturated compounds formed as intermediates.

The process according to the invention proceeds with formation of both the alkadiene and the alkene and alkane derivatives, so that the reaction mixture obtained will in general contain a certain quantity of each of these compounds. For example, the coupling of two vinyl acetate molecules by means of palladium acetate in the presence of excess acetic acid will yield a reaction mixture containing 1,4-diacetoxy-1,3-butadiene, 1,1,4-triacetoxy-3-butene, and 1,1,4,4-tetraacetoxybutane. The process of the invention is not limited to similar groups $R_1$ and $R_3$, $R_2$ and $R_4$, $R_5$ and $R_6$. In case $R_1$ is dissimilar to $R_3$, $R_2$ dissimilar to $R_4$, and $R_5$ dissimilar to $R_6$, the reaction mixture contains not only two different symmetric acyloxy-substituted alkadienes formed by coupling of two identical unsaturated molecules of each different type, but also one asymmetric acyloxy-substituted alkadiene formed by the combination of an unsaturated molecule of one type with a molecule of the other type. The same is true of the number of acyloxy-substituted alkanes, while the number of alkene compounds in the reaction mixture is even increased by one.

Optionally, one may incorporate in the reaction mixture one or more compounds which are capable of preventing formation, if any, of polymeric products. For this purpose hydroquinone is especially recommended. Small quantities of these inhibitors, for example from 0.001 to 1% m., calculated on the precious metal salt, are as a rule sufficient.

As stated above, during the reaction the valency of the metallic components in the precious metal salts is reduced, for example to the nonvalent state. By a separate operation the valency of the precious metals can be raised to the original value again, preferably by oxidation with oxygen or an oxygen-containing gas, such as air. Thus, for example, metallic palladium can be oxidized, bivalent palladium ions being formed. A high rate of oxidation is promoted if the regeneration is effected in the presence of compounds containing one or more nitrate groups. Of these compounds nitric acid is preferred, because the use of this reagent has a considerable effect on the rate of reaction. The quantities in which the nitrate group(s)-containing compounds are used are in general so large that the ratio of nitrate groups to atoms of precious metal is between 0.001 and 0.5.

The rate of regeneration can be further increased by performing the oxidation in the simultaneous presence of one or more oxidation promoters, usually in a quantity of between 0.1 and 50% m., calculated on the precious metal. Suitable promoters are for example various salts of metals forming redox systems, such as compounds of iron, copper, cobalt, vanadium, cerium and tin. Frequently nitrates and halides are used, particularly chlorides, as well as carboxylates, such as acetates. Other active promoters are for example nitrogen dioxide and compounds of zinc and magnesium. The promoters can be advantageously applied in combination with halides of alkali and/or alkaline earth metals. The rate of regeneration can be further increased by the addition of active carriers, preferably molecular sieves. If desired, the regeneration can also be performed in situ. It is then advantageous to use metal salts which form redox systems, in particular copper and iron salts, preferably in excess. The molar quantities may be more than ten times, say twenty times as large as the molar quantities of precious metal salts. Very favorable results have been obtained by performing the regeneration in the presence of copper acetate, copper chloride, iron acetate and lithium chloride.

According to the invention the reaction mixture contains excess acid. The molar quantity of acid present in the mixture is at least 10% of the sum of the molar quantities of the 1-alkenyl carboxylates, but preferably 1 to 10 times said molar sum.

Preferably one starts with an excess of the aforementioned 1-alkenyl carboxylates, for example with a molar quantity which is 5 to 50 times as large as that of the precious metal salts. In this way the unsaturated 1-alkenyl carboxylates may also serve as reaction solvent.

If desired, one may also use other liquids inert in the process as solvents or diluents, preferably polar compounds, such as 1,2-dimethoxyethane, sulfolane and dimethylformamide.

The presence of water in the reaction mixture may lead to the occurrence of undesired side reactions. Hence, reaction of the 1-alkenyl carboxylates and the precious metal salts in accordance with the present invention is carried out in a substantially anhydrous liquid medium. A water content in the liquid medium of up to 5 percent by weight of the reaction mixture may be accommodated; however, it is preferred that the water content be not more than 2 percent by weight.

In the present process moderate reaction conditions are usually maintained. Customary reaction temperatures are between 0 and 150° C. In particular, temperatures of between 30 and 80° C. are preferred.

The reaction is usually performed at atmospheric pressures, although higher or lower pressures may also be used.

The products formed, the acyloxy-substituted alkadienes, alkenes, and alkanes, can, according to conventional techniques, be isolated from the reaction mixtures. A suitable method for isolation is subjecting the entire reaction mixture to a fractional distillation. If desired, one may also first distill from the mixture any excess of the 1-alkenyl carboxylate starting materials and any additional solvents present followed by treatment of the residue with a suitable extractant. The desired product can then be recovered from the extract by distillation.

The total yield of acyloxy-substituted alkadienes from the reaction mixture can be increased by converting the acyloxy-substituted alkanes and alkenes in the mixture by pyrolysis reactions into acyloxy-substituted alkadienes, while splitting off carboxylic acid molecules. Such reactions proceed best of all in the presence of carboxylic-acid-binding substances, such as acetic anhydride, and alkali and alkaline-earth acetates. It has been found that the pyrolysis reactions can even occur during the isolation of the aforementioned alkadienes from the reaction mixture by means of fractional distillation, so that in this isolation a larger quantity of acyloxy alkadienes can be obtained than is in fact present in the reaction mixture to be separated.

The diacyloxybutadiene compounds and triacyloxybutene compounds obtained according to the present process are very useful as monomers in various polymerization processes. Thus, for example, 1,4-diacetoxy-1,3-butadiene can be copolymerized with butadiene, in which copolymerization, for example a molar ratio of 1:100 may be chosen. After saponification of the acetate groups, the polymers so prepared contain a number of hydrophilic groups. If desired, further reaction, for example with polyisocyanates, may yield cross-linked products.

The diacyloxyalkadiene compounds according to the invention are also very suitable as starting materials in reactions of the Diels-Alder type, for example for the preparation of hydroquinone derivatives. They form valuable intermediates for the preparation of various chemicals such as, for example, pharmaceutical products.

The tetraacyloxyalkane compounds are also very useful; they can for example be hydrolyzed to dialdehydes, which in turn can be used in interesting ring closure reactions or be hydrogenated to diols.

EXAMPLE I

A reactor equipped with a stirrer contained a mixture of 14 moles of vinyl acetate, 0.320 mole of palladium acetate and 0.1 gram of hydroquinone as inhibitor. This mixture was stirred vigorously at a temperature of 60–65° C., during which metallic palladium began to separate fairly rapidly. After 2½ hours the reaction was discontinued. The quantity of palladium precipitated and isolated by filtration was 66% of the quantity of bivalent palladium started with. The excess vinyl acetate and the acetic acid formed in the reaction were distilled from the filtrate. The residue was extracted with a gasoline fraction having a boiling range of 60–80° C. and the extract was fractionated at reduced pressure by means of a Vigreux column. This yielded 38.2 grams of a fraction which had a boiling range of 75–112° C., at 1 mm. mercury pressure.

By analysis with infrared, ultraviolet and nuclear spin resonance spectroscopy it was established that this fraction contained 16.7 grams of 1,4-diacetoxy-1,3-butadiene. More than 90% of it consisted of the cis,cis-isomer. The quantity of obtained corresponds with a yield of 46.5% calculated on converted palladium acetate.

From this fraction 4.2 grams of solid material crystalized at room temperature. Another 10.2 grams of solid product could be isolated by treating the fraction with a two-fold quantity of gasoline (boiling range 60–80° C.) and cooling the liquid obtained to 0° C.

After two recrystallizations from a gasoline fraction (boiling range 60–80° C.) and methanol, respectively, the crystalline material melted at 97–99° C. The molecular weight was 171. The carbon content of the material was 56.2%, the hydrogen content 6.1% and the oxygen content 37.6%. Calculated for 1,4-diacetoxy-1,3-butadiene, these amounts are 56.5%, 5.88% and 37.62%, respectively.

The aforesaid spectroscopic measurements further showed that in addition to 1,4-diacetoxy-1,3-butadiene, also 1,4,4-triacetoxy-3-butene had been formed. The yield of this compound was 37.6%, calculated on converted palladium acetate.

EXAMPLE II

A reaction vessel provided with a stirrer contained a mixture of 9 grams of palladium acetate, 14.5 grams of cupric acetate, 0.1 gram of hydroquinone as inhibitor and 150 grams of vinyl acetate. The mixture was stirred vigorously for two hours at 60° C. In this period no formation of metallic palladium could be observed, so that apparently the palladium reduced in the reaction was regenerated in situ by the cupric acetate.

The reaction mixture was treated as described in Example I. The yield of 1,4-diacetoxy-1,3-butadiene was 2.5 grams, that of triacetoxybutene, 3.3 grams.

EXAMPLE III

A reactor equipped with a stirrer contained a mixture of 2.5 moles of vinyl acetate, 5 moles of acetic acid, 0.1 mole of palladium acetate and 30 mg. of hydroquinone as inhibitor. This mixture was stirred vigorously at a temperature of 60° C., during which metallic palladium began to separate fairly rapidly. After three hours the reaction was discontinued. The quantity of palladium precipitated and isolated by filtration was 59% of the quantity of bivalent palladium started from. The excess vinyl acetate and the acetic acid formed in the reaction were distilled from the filtrate. The residue was extracted with a gasoline fraction having a boiling range of 60–80° C. and the extract was fractionated at reduced pressure by means of a Vigreux column. The fraction, which at 1 mm. mercury pressure had a boiling range of 75–112° C., was isolated.

By analysis with infrared, ultraviolet and nuclear spin resonance spectroscopy it could be established that this fraction contained 2.5 grams of 1,4-diacetoxy-1,3-butadiene, 4.5 grams of 1,1,4-triacetoxy-3-butene, and 5.1 grams of 1,1,4,4-tetraacetoxybutane. The quantity of these three compounds together corresponds to a yield of 88.1% calculated on converted palladium acetate.

EXAMPLE IV

The experiment described in Example III was repeated under identical conditions with the exception of

|  | Run A | Run B |
|---|---|---|
| Quantity of acetic acid | 5 moles | 10 moles. |
| Quantity of vinyl acetate | 1 mole | 1 mole. |
| Reaction time | 3½ hours | 4 hours. |

Upon the reaction being terminated, in Run A, 60.5%, in Run B, 63% of the quantity of palladium acetate originally present in the reaction mixture had been converted.

The reaction mixture was in both runs worked up as described in Example III. The yield of 1,4-diacetoxy-1,3-butadiene, 1,1,4-triacetoxy-3-butene, and 1,1,4,4-tetraacetoxybutane, respectively in Run A was 2.1, 3.8 and 6.5, respectively, and in Run B, 1.4, 4.1 and 8.0 grams, respectively. The total quantities of the said butadiene, butene and butane compounds corresponded to a yield, calculated on converted palladium acetate, of 86.2% in Run A and 85.4% in Run B.

I claim as my invention:

1. The process of producing acyloxy-substituted conjugated alkadienes, alkenes, and alkanes, in which the grouping

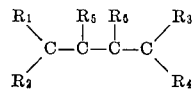

occurs, in which grouping each of the terminal carbon atoms may be attached by a double bond to the adjacent carbon atom or to a group $R_7$, in which case the adjacent carbon atom, in addition to the substituent $R_5$ or $R_6$, also carries a hydrogen atom, and in which $R_1$, $R_3$ and $R_7$ are acyloxy groups of from 2 to 21 carbon atoms derived from hydrocarbon carboxylic acids and $R_2$, $R_4$, $R_5$ and $R_6$ represent a hydrogen atom or lower alkyl group of 1 to 5 carbons, by reacting under substantially anhydrous conditions and at a temperature between 0° and 150° C. 1-methylenealkyl hydrocarbylcarboxylates of the formula

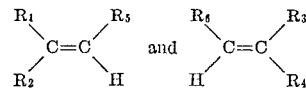

wherein $R_1$, $R_2$, $R_3$, $R_4$, $R_5$ and $R_6$ are defined as above, with carboxylates of precious metals of Group VIII of the Periodic Table of the Elements from the group consisting of ruthenium, rhodium, palladium, osmium, iridium and platinum in the presence of a quantity of a carboxylic acid $HR_7$ of at least 10 mole percent, based on said 1-methylenealkyl hydrocarbylcarboxylates, and $R_7$ is defined as above.

2. The process according to claim 1 in which the precious metal salt is a salt of a carboxylic acid $HR_7$.

3. The process according to claim 1 in which $R_1$ is similar to $R_3$ and to $R_7$, $R_2$ is similar to $R_4$, and $R_5$ and $R_6$ are hydrogen atoms.

4. The process according to claim 1 in which the precious metal is palladium.

5. The process according to claim 4 in which $R_1$, $R_3$ and $R_7$ are acetoxy groups and $R_2$ and $R_4$ are hydrogen atoms.

6. The process according to claim 4 in which the salt of palladium is palladium carboxylate of an alkanoic acid of 2 to 21 carbons.

7. The process according to claim 4 conducted in the presence of cupric acetate.

8. The process according to claim 6 in which the palladium carboxylate is palladium acetate.

9. The process according to claim 4 conducted at a temperature between 30° and 80° C.

10. The process according to claim 4 conducted in the presence of hydroquinone as polymerization inhibitor.

11. The process according to claim 5 wherein the product is a mixture of 1,4-diacetoxy-1,3-butadiene, 1,1,4-triacetoxy-1-butene and 1,1,4,4-tetraacetoxybutane.

References Cited
FOREIGN PATENTS
964,001 7/1964 Great Britain.
975,683 11/1964 Great Britain.

LORRAINE A. WEINBERGER, *Primary Examiner.*

V. GARNER, *Assistant Examiner.*